United States Patent [19]

Chia

[11] 3,996,161

[45] * Dec. 7, 1976

[54] ACTIVE CARBON AND A METHOD OF PREPARING THE SAME

[76] Inventor: Tung-Yu Chia, 32-50, 70th St., Apt. 5J, East Elmhurst, N.Y. 11370

[ * ] Notice: The portion of the term of this patent subsequent to Oct. 26, 1993, has been disclaimed.

[22] Filed: Nov. 26, 1974

[21] Appl. No.: 527,272

[30] Foreign Application Priority Data

Mar. 5, 1974 Japan ............................. 49-24851

[52] U.S. Cl. .............................. 252/428; 252/444
[51] Int. Cl.$^2$ ........................................ B01J 31/02
[58] Field of Search .......................... 252/428, 444

[56] References Cited

UNITED STATES PATENTS

| | | | |
|---|---|---|---|
| 2,136,167 | 11/1938 | Higgins | 252/428 |
| 3,406,011 | 10/1968 | Duisburg et al. | 252/444 |
| 3,479,299 | 11/1969 | Rivin et al. | 252/444 |
| 3,491,031 | 1/1970 | Stoneburner | 252/428 X |

*Primary Examiner*—Patrick P. Garvin
*Assistant Examiner*—John P. Sheehan
*Attorney, Agent, or Firm*—Flynn & Frishauf

[57] ABSTRACT

When activated by polar compounds containing non-polar groups bonded with polar groups, coal powders provide inexpensive suitable active carbon for treatment of waste liquid.

8 Claims, No Drawings

ACTIVE CARBON AND A METHOD OF PREPARING THE SAME

BACKGROUND OF THE INVENTION

This invention relates to active carbon for treatment of waste liquid and a method of preparing the same.

A mechanical separation process, for example, sedimentation or filtration applied in treating waste liquid such as sewage or plant waste liquid generally utilizes adsorption by active carbon of the contaminating substances contained in the waste liquid which are difficult to eliminate.

The customary process of preparing active carbon for treatment of the above-mentioned waste liquid consists in carburizing vegetable material in an inert atmosphere and activating the carburized mass by gas, for example, steam. However, the active carbon prepared by the conventional process becomes unavoidably expensive, because the raw material itself is costly and the manufacturing process is complicated.

SUMMARY OF THE INVENTION

It is accordingly an object of this invention to provide active carbon which is far less expensive than the prior art and yet displays the same effect.

Another object of the invention is to provide a process of preparing such active carbon.

One of the characteristics of an active carbon-manufacturing process according to the invention is to activate raw coal powders by a polar compound containing nonpolar groups bonded with polar groups.

Another characteristic of said process is to immerse coal powders in an aqueous solution of said polar compound and wash the immersed mass, followed by drying.

Detailed Description of the Invention

The nonpolar and polar groups included in the polar compound used in this invention are listed below. As used herein, the terms "nonpolar and polar groups" are not applied in a rigid sense. Namely, the nonpolar group means a nonpolar or low polar group, and the polar group denotes a high polar group.

Nonpolar groups:
1. Alkyl group — R—
2. Alkyl group containing carboxylate — R—CO.O—R—
3. Alkyl group containing an ether linkage — —R—O—R
4. Alkyl group containing acid amide linkage — —R—CO.NH—R—
5. Phenyl group

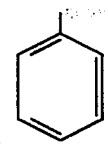

6. Alkylphenyl group

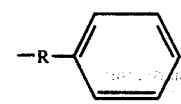

7. Alkylnaphthalene group

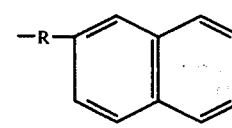

8. Alkyl diphenyl group

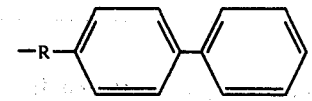

9. Alkylbenzimidazole group

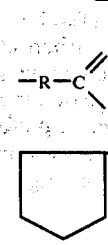

10. Cyclopentyl group

11. Abietic acid ring

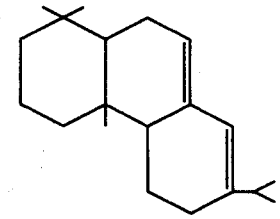

Polar groups:
1. Sulfate group      $-OSO_3H(M)$
2. Sulfonic group

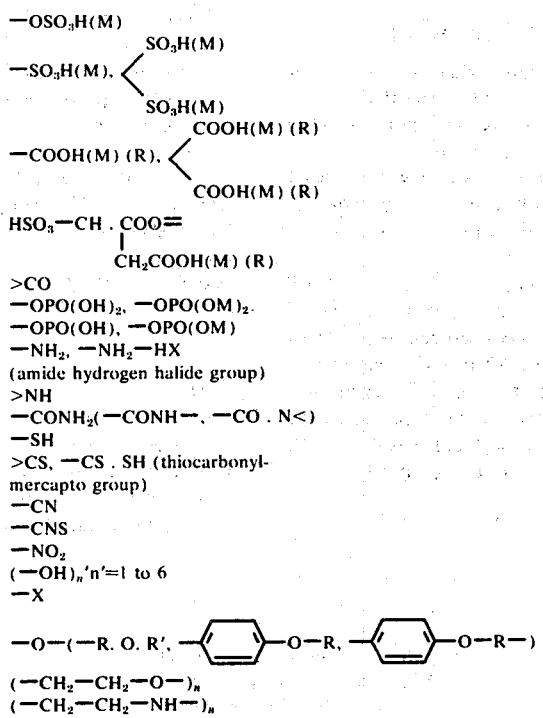

3. Carboxylate group
4. Sulfocarboxylate group     $HSO_3-CH.COO=$
                                | 
                             $CH_2COOH(M)(R)$
5. Carbonyl group      $>CO$
6. Phosphate group     $-OPO(OH)_2, -OPO(OM)_2$.
                         $-OPO(OH), -OPO(OM)$
7. Amide group      $-NH_2, -NH_2-HX$
                        (amide hydrogen halide group)
8. Imide group      $>NH$
9. Acid amide group      $-CONH_2(-CONH-, -CO.N<)$
10. Mercapto group      $-SH$
11. Thiocarbonyl group      $>CS, -CS.SH$ (thiocarbonyl-
                        mercapto group)
12. Cyano group      $-CN$
13. Thiocyanate group      $-CNS$
14. Nitro group      $-NO_2$
15. Hydroxyl group      $(-OH)_n, n'=1$ to 6
16. Halogen group      $-X$
17. Ether linkage $-O-(-R.O.R',$ —⟨ ⟩—$O-R$, —⟨ ⟩—$O-R-)$ 18. Polyethylene oxide group      $(-CH_2-CH_2-O-)_n$
19. Polyethylene amide group      $(-CH_2-CH_2-NH-)_n$
20. Quarternary ammonium group

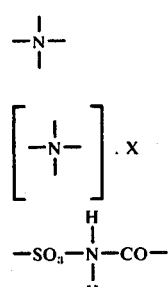

Halogenized quarternary ammonium group

Sulfocarbonyl quarternary ammonium group

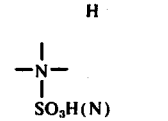

21. Sulfonate-tertiary amide group

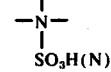

The alkyl groups R and R', each usually contain 10–20 carbon atoms (preferably 10–15 carbon atoms). Alkyl groups of 10–13 carbon atoms, e.g., lauryl, are most preferred. The repeating groups n are usually 1–10 units, with the range of $n = 3 - 10$ more preferred, and the range of 5–10 most preferred. M is $NH_4$ or an alkali metal, with sodium and potassium being the first and second preferences among the alkali metals. X is a halogen. The preferred halogens, listed in order of preference, are chlorine, bromine, and iodine.

Although a polar compound containing any combination of the above-listed nonpolar and polar groups is available for the object of this invention, the preferred types are the polar compounds of the following sixteen numbered formulas, with such polar compounds having less than twenty-five carbon atoms being particularly preferred.

1. Alkyl sulfate      $R-OSO_3M$
2. Alkyl sulfonate i) $R-SO_3M$

ii) 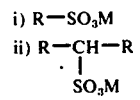

3. Alkylaryl sulfonate i) 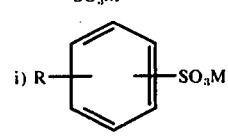

-continued

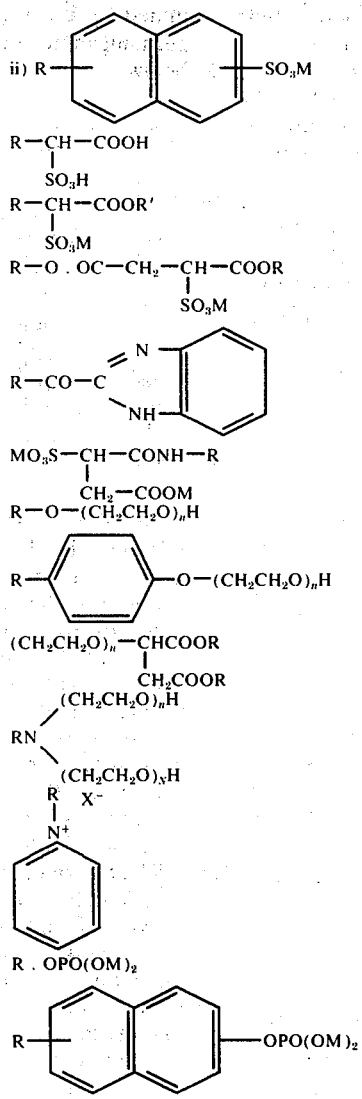

4. α-sulfonate fatty acid
5. α-sulfonated fatty ester
6. Dialkyl sulfo-succinate
7. Fatty acid benzimidazoline
8. Succinic amide alkyl ester sulfonate
9. Polyoxyethylene alkyl ether
10. Polyoxyethylene alkylphenol ether
11. Polyoxyethylene polyol fatty ester
12. Polyoxyethylene alkylamine
13. Alkylpyridinium halide
14. Alkyl phosphate
15. Alkylaryl phosphate The R and/or R' groups and values of the integer $n$ are selected so that the aforelisted compounds contain less than 25 carbon atoms. The compounds used in the Examples fall within the preferred values of $n$.

The raw coal for this invention may consist of any of peat, lignite, brown coal, bituminous coal and anthracite. Even high ash, high sulfur low grade coal is also available.

The active carbon of the invention can be prepared by the following process. Powders of the above-mentioned coal are immersed in an aqueous solution containing a specified concentration (generally about 0.01 to 1% by weight) of any of the above-listed polar compounds for sufficient time to form said active carbon. The aqueous solution preferably contains between about 0.01 and 0.06% with 0.03–0.06% most preferred. The temperature of the aqueous solution is preferably ambient temperature, with up to about 40° C preferred i.e., 0°–40° C. The immersion time is preferably between about 90 and 120 minutes. A longer immersion (which is more costly) does not appear to improve the product, and a shorter immersion may not be sufficient to fully activate the carbon. The coal powders are desired to bear a weight ratio of 1:3 to 5 to said aqueous solution. After taken out of the solution, the coal powders are washed to remove impurities, followed by drying. As described above, an active carbon-manufacturing process according to this invention is extremely simple. The invention will be more fully understood by reference to the examples which follow.

EXAMPLE 1

A plurality of 2 kg lots of 200 mesh powders of brown coal (water content: 2.7%; ash content: 41.88%; sulfur content: 12.01%; BTU: 8,177) were weighed out. These lots were respectively immersed in aqueous solutions each weighing 8 kg and containing the eight kinds of polar compounds listed in Table 1 below. Immersion was continued 100 minutes while stirring was applied sometimes. Said aqueous solutions had concentrations and temperatures shown in Table 1 opposite to the corresponding polar compounds. Upon completion of immersion, the 2 kg lots of brown powders were washed 10 times with 10 liters of running water and dried 12 hours at 150° C to provide active carbon.

These lots of active carbon treated 90 minutes with stirring the samples taken from a ditch in Long Island, N.Y., U.S.A., which had previously been boiled 2 hours for sterilization and filtered through a glass filter. Upon completion of treatment, the active carbon was removed, and the chemical oxygen demand (COD) of the respective filtrates was determined by the standard test method, the results being set forth in Table 2 below.

Table 1

| Sample No. | Polar Compounds | Concentration of an aqueous solution containing a polar compound (% by weight) | Temperature of a polar compound solution in which the coal powders were immersed (° C) |
|---|---|---|---|
| 1 | Lauryl sulfate | 0.14 | 20 |
| 2 | Lauryl sulfate | 0.04 | 35 |
| 3 | Oleyl sulfate | 0.13 | 20 |
| 4 | Oleyl sulfate | 0.02 | 35 |
| 5 | Sodium oleyl-methyl amino ethanesulfonate | 0.11 | 20 |
| 6 | Sodium oleylmethyl amino ethanesulfonate | 0.01 | 35 |
| 7 | Sodium dibutyl naphthalene sulfonate | 0.10 | 20 |
| 8 | Sodium dibutyl naphthalene sulfonate | 0.05 | 35 |
| 9 | Polyoxyethylene dodecylphenol ether | 0.11 | 20 |
| 10 | Polyoxyethylene dodecylphenol ether | 0.03 | 35 |
| 11 | Sorbitan monolaurate polyglycol ether | 0.10 | 20 |
| 12 | Sorbitan monolaurate polyglycol ether | 0.05 | 35 |
| 13 | Oleyl sarcoside | 0.15 | 20 |
| – | Oleyl sarcoside | 0.04 | 35 |
| 15 | Sodium di(n-octyl) sulfosuccinate | 0.05 | 20 |
| 16 | Sodium di(n-octyl) sulfosuccinate | 0.02 | 35 |

Table 2

| Sample No. | Amount of active carbon added (mg/L) | Residual COD (mg/L) |
|---|---|---|
|  | 0 | 45.84 |
| 1 | 1000 | 15.40 |
| 2 | 1000 | 15.39 |
| 3 | 1000 | 15.40 |
| 4 | 1000 | 15.39 |
| 5 | 1000 | 15.40 |
| 6 | 1000 | 15.39 |
| 7 | 1000 | 15.40 |
| 8 | 1000 | 15.39 |
| 9 | 1000 | 15.40 |
| 10 | 1000 | 15.39 |
| 11 | 1000 | 15.40 |
| 12 | 1000 | 15.39 |
| 13 | 1000 | 15.40 |
| 14 | 1000 | 15.39 |
| 15 | 1000 | 15.40 |
| 16 | 1000 | 15.39 |

Note: The above values of the residual COD each denote the average of four measurements.

EXAMPLE 2

This example was carried out to compare the effect of the vegetable source active carbon of the prior art and that of the active carbon of this invention. A filtrate obtained by passing contaminated river water through a glass filter and a sterilization filter was treated 90 minutes with stirring, using on one hand the sample No. 1 of active carbon prepared by the process of this invention shown in Example 1 and on the other hand water-treating lignin base vegetable active carbon manufactured by Westvaco Co. under a commercial name "Aqua Nuchar". After both types of active carbon were removed, the COD of the filtrate was determined by the standard test method using potassium permanganate, the results being set forth in Table 3 below.

Table 3

| Amount of active carbon added mg/L | Residual COD (mg/L) | | Eliminated COD (%) | |
|---|---|---|---|---|
|  | Active carbon of this invention | Prior art active carbon | Active carbon of this invention | Prior art active carbon |
| 0 | 33.9 | 33.9 | 0 | 0 |
| 25 | 32.3 | 28.8 | 4.8 | 15.1 |
| 50 | 29.0 | 25.7 | 14.5 | 24.2 |
| 100 | 25.7 | 21.7 | 24.2 | 36.0 |
| 200 | 22.0 | 18.0 | 35.1 | 47.0 |
| 400 | 16.9 | 13.6 | 50.2 | 60.0 |
| 1000 | 11.4 | 9.7 | 66.4 | 71.4 |
| 2000 | 9.7 | 9.0 | 71.4 | 73.5 |

Note: The above values of the residual COD are the average of four determinations.

The above Table 3 shows that the active carbon of this invention has practically the same effect of eliminating contaminating substances like organic carbon material as the prior art vegetable source active carbon. However, the active carbon of the invention offers a prominent advantage as a waste liquid-treating agent, because the inexpensiveness of raw material and the simple manufacturing process enable the manufacturing cost to be reduced to about one-tenth of that which is required for the prior art vegetable source active carbon. Further, raw material for the active carbon of the invention may consist of, for example, wood or lignin which has been properly carburized.

What is claimed is:

1. A method of preparing active carbon for treatment of waste liquid comprising immersing powdered coal into an aqueous solution of a polar compound containing a non-polar group bonded to a polar group, and then washing the immersed coal followed by drying of said washed coal; said aqueous solution containing between about 0.01% and 1% by weight of said polar compound, and said powdered coal being in a weight ratio to said aqueous solution of between 1:3 and 1:5; and said polar compound being selected from the group consisting of:

(a) alkyl sulfate
  $R-SO_3M$
(b) alkyl sulfonate
  i) $R-SO_3M$
  ii) $R-CH-R$
     $\phantom{ii) R-C}|$
     $\phantom{ii) R-CH-}SO_3M$
(c) α-sulfonated fatty acid
  $R-CH-COOH$
  $\phantom{R-C}|$
  $\phantom{R-CH-}SO_3H$
(d) dialkyl succinate
  $R-O \cdot OC-CH_2-CH-COOR$
  $\phantom{R-O \cdot OC-CH_2-C}|$
  $\phantom{R-O \cdot OC-CH_2-CH-}SO_3M$
(e) fatty acid benzimidazoline
  $R-CO-C\overset{\diagup N}{\underset{\diagdown NH}{}}\!\!\!\bigcirc$
(f) succinic amide alkyl ester sulfonate
  $MO_3S-CH-CONH-R$
  $\phantom{MO_3S-}|$
  $\phantom{MO_3S-}CH_2-COOM$
(g) polyoxyethylene alkyl ether
  $R-O-(CH_2CH_2O)_nH$ -continued (h) polyoxyethylene alkylphenol ether
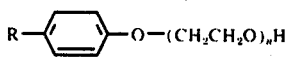

(i) polyoxyethylene polyol fatty ester
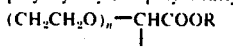

(j) polyoxyethylene alkylamine

(k) alkylpyridinium halide
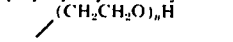

(l) alkyl phosphate
R . OPO(OM)$_2$ (m) alkylaryl phosphate

wherein R and R' are alkyl groups having between about 10 and 20 carbon atoms, M is selected from the group consisting of NH$_4$ and alkali metals, X is a halogen and $n$ is an integer from 1 to about 10.

2. A method of preparing active carbon according to claim 1 wherein the polar compound has less than 25 carbon atoms.

3. A method of preparing active carbon according to claim 2 wherein said aqueous solution contains between 0.01 and 0.06% by weight of said polar compound, and said aqueous solution is at a temperature between 0° C and 40° C.

4. A method of preparing active carbon according to claim 3 wherein $n$ is 3–10, M is sodium or potassium, X is chlorine, bromine or iodine, and R and R' are alkyl groups having 10–15 carbon atoms.

5. A method of preparing active carbon according to claim 4 wherein immersion is for between about 90 and 120 minutes while said aqueous solution is at ambient temperature.

6. A method of preparing active carbon according to claim 5 wherein said concentration is between 0.01 and 0.03%.

7. A method of preparing active carbon according to claim 1 wherein said aqeuous solution is at a temperature between 0° C and 40° C.

8. An active carbon for treating waste liquids comprising powdered coal activated in accordance with the method of claim 1.

* * * * *